Patented Aug. 7, 1923.

1,463,884

UNITED STATES PATENT OFFICE.

HENRY A. GARDNER, OF WASHINGTON, DISTRICT OF COLUMBIA.

COATED OR IMPREGNATED BODY AND METHOD OF PREPARING THE SAME.

No Drawing. Application filed June 30, 1920. Serial No. 393,090.

*To all whom it may concern:*

Be it known that I, HENRY A. GARDNER, a citizen of the United States, residing at Washington, in the District of Columbia, have invented certain new and useful Improvements in Coated or Impregnated Bodies and Methods of Preparing the Same, of which the following is a specification.

In a copending application Serial No. 388,913, filed June 14, 1920, I have pointed out that tung oil (including not only the oil derived from the nuts of the Chinese wood oil tree but also other allied oils from plants of the Aleurites family) is capable of entering into reaction with such unsaturated hydrocarbons as can be prepared by chlorinating a mineral oil and thereafter eliminating a part at least of the combined chlorin; also that these two substances appear to be capable of reacting with each other in all proportions, with or without the use of catalytic agents or accelerators, and either at normal or higher temperatures. I have also pointed out in the said application that the resulting reaction products are solid bodies, over an extremely wide range of admixture of the respecting reacting liquids.

The present invention relates, in one of its aspects, to the application of the above reaction to the formation in situ of protective films or coatings for surfaces, for example of metal, paper and paper-like products, fabrics, wood, concrete and other cementitious materials, etc. etc. Where the material to be protected is of a porous or absorptive nature, or is in comminuted or subdivided form, it may be impregnated to a greater or less depth, or throughout its body or mass, as hereinafter more fully described. In any case, according to this invention, the reaction product is produced in situ in or on the substance or article to be coated or protected, or within the mass of the article in process of formation. The reaction products thus formed are extremely resistant to most chemical reagents, including the ordinary neutral solvents, acid or alkaline liquids, etc. They may be prepared in such manner as to resemble quite closely unvulcanized rubber in many of its characteristics, and may be used in the form of films or surface coatings for the most diverse purposes, including the interior lining of wooden, steel or concrete tanks, tank cars, etc.

Mixtures of tung oil with unsaturated hydrocarbons of the type referred to (hereinafter for convenience referred to simply as "dechlorinated oils") will react slowly at ordinary or somewhat higher temperatures, so that the process may be carried out by merely applying such mixtures, as by brushing, spraying or dipping, to the article to be coated or impregnated, and allowing the same to stand at normal or somewhat higher temperatures for some days or weeks, or until solidification has taken place. In case of articles which are not subjected to injury by exposure to somewhat higher temperatures the solidification may be hastened, and even rendered substantially instantaneous by heating to a sufficient temperature, say about 180–200° C. Or, as an alternative method, the reaction may be accelerated by the use of appropriate catalysts or accelerators, of which sulfur and sulfur-bearing bodies such as sulfur chlorid are now regarded as the most advantageous.

The sulfur chlorid may either be mixed in very small proportions (say 1% or less) with the reacting bodies (tung oil and dechlorinated oil) or the mixture of tung oil and dechlorinated oil in the desired proportions may be spread upon or absorbed by the surface to be protected, and then exposed to the vapors of sulfur chlorid, or sulfur chlorid may be sprayed or brushed onto the surface, whereupon the mixture is transformed in the course of a few hours to the insoluble reaction product above mentioned. This latter method is especially advantageous for the protection of the interior surfaces of tanks or vats, tank cars etc. etc., whether of metal, wood, concrete or other material. It is likewise applicable to the coating and impregnation of paper, fabrics, etc., which require merely to be exposed, after coating or impregnation with the reactive mixture, to the sulfur chlorid vapors at ordinary or somewhat higher temperatures.

The present invention is not limited to the use of tung oil and dechlorinated oil in any particular proportions, inasmuch as these materials have been found to be capable, as stated above, of yielding solid reaction products over an extremely wide range of admixture, varying from around 90 parts of dechlorinated oil to 10 parts of tung oil, to around 90 parts of tung oil to 10 parts of dechlorinated oil. Mixtures containing 40 to 60 parts of tung oil with 60 to 40 parts of dechlorinated oil are satisfactory.

A further advantageous embodiment of the invention consists in its application to the production of laminated products by coating or impregnating sheets of paper, fabric, wood or even metal; then superposing these while the mixture is still liquid or tacky; and finally consolidating them by pressure, effecting the solidification of the oil, either by heating or otherwise, preferably while the pressure is being applied.

A further advantageous embodiment of the invention consists in compounding the mixture of tung oil and dechlorinated oil, with or without a small proportion of such accelerators as are mentioned above, with sufficient inert filling material, which may comprise any of the ordinary organic or inorganic fillers, pigments, etc., to constitute a molding mixture; then molding into any desired form and effecting the solidification of the binding material, preferably while the pressure is maintained. The solidification may be accelerated when desired by heating the mold, while maintaining the molding pressure, to the necessary reacting temperature, say 180–200° C. or even higher.

Colored products suitable for use in the manufacture of linoleum or the like may be prepared by the incorporation with the tung oil-dechlorinated oil mixture, of suitable pigments, such for example as iron oxid or the like, or by the use of appropriate dyes or other coloring materials. Similarly a wide variety of modifying agents of the most varied type may be used to impart special physical characteristics to the reaction product. Among such modifying agents rubber and rubber-like gums are especially advantageous. In particular, unvulcanized rubber may be incorporated with the mass and subsequently vulcanized, the sulfur for the vulcanization serving also as an accelerator for the tung oil-dechlorinated oil reaction. Or a solution of unvulcanized rubber in benzol or other solvent may be mixed with tung oil and dechlorinated oil in any desired proportions, together if desired with small proportions of sulfur chlorid. For example I have prepared such products from mixtures of substantially equal proportions of a 10% rubber solution in benzol, tung oil, and dechlorinated oil; and also from mixtures containing as high as 90 parts of the rubber solution, with approximately 5 parts each of tung oil and dechlorinated oil. The resulting products, while varying somewhat among themselves, were black, lustrous gelatinous bodies, easily reducible to meal by pressure, and well suited for compounding with rubber and for analogous purposes.

Many other modifications of the invention will be apparent to those skilled in this art.

The dechlorinated oil used in accordance with the present invention may be prepared in any suitable way, but preferably in substantially the manner described in application Serial No. 343,458, filed Dec. 9, 1919, Gardner & Bielouss: that is to say a mineral oil or distillate, preferably of the paraffin type, is chlorinated to a suitable extent for the particular purpose in view, the chlorin absorbed by the oil usually amounting to between 30 and 60% by weight of the original oil. The chlorinated product is thereafter preferably diluted by a lighter hydrocarbon, such for example as so-called mineral spirit (boiling point 160–220° C.) or even by an unchlorinated portion of the original hydrocarbon; and is heated, preferably under a reflux condenser, to about 170–190° C., a suitable accelerating agent for the dechlorination being added, such for example as granulated zinc or mixtures thereof with copper, iron filings, or the like. The heating is continued until the evolution of hydrochloric acid substantially ceases. For many purposes the liquid prepared as above may be employed without further modification, for admixture with the tung oil. For certain purposes, especially in the plastic and analogous arts, it is desirable before compounding the dechlorinated oil with the tung oil to remove therefrom a part or all of the added solvent, which may readily be accomplished by distillation up to about 220° C. in air, or preferably at a lower temperature under correspondingly reduced pressure. For other purposes the diluent may be retained in the product as a desirable or essential component thereof.

I claim:—

1. As a new article of manufacture, a body material having a coating comprising a solid reaction product of tung oil and dechlorinated oil.

2. As a new article of manufacture, a porous material whereof the superficial portion at least is impregnated with a solid reaction product of tung oil and dechlorinated oil.

3. As a new article of manufacture, a sheet of flexible pervious material coated or impregnated with a solid reaction product of tung oil and dechlorinated oil.

4. As a new article of manufacture, a laminated product comprising a plurality of sheets of flexible material, and a binding agent comprising a solid reaction product of tung oil and dechlorinated oil.

5. A novel molding composition comprising an inert material, tung oil and dechlorinated oil.

6. A novel molding composition comprising an inert fibrous material, tung oil and dechlorinated oil.

7. The herein described method which consists in coating or impregnating a suitable material with a mixture containing tung oil and dechlorinated oil, and causing said components to react in situ to yield a solid reaction product.

8. The herein described method which consists in coating or impregnating a suitable material with a mixture containing tung oil and dechlorinated oil, and causing said components to react in situ to yield a solid reaction product by exposing the same to sulfur chlorid or equivalent accelerator in vapor form.

In testimony whereof, I affix my signature.

HENRY A. GARDNER.